(12) United States Patent
Nikolayev et al.

(10) Patent No.: US 9,412,096 B2
(45) Date of Patent: Aug. 9, 2016

(54) TECHNIQUES TO FILTER ELECTRONIC MAIL BASED ON LANGUAGE AND COUNTRY OF ORIGIN

(75) Inventors: Alexander Nikolayev, Kirland, WA (US); Mauktik Gandhi, Redmond, WA (US); Mukesh Beher, Redmond, WA (US); Manivannan Sundaram, Bothell, WA (US); Terence Zink, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 525 days.

(21) Appl. No.: 13/537,624

(22) Filed: Jun. 29, 2012

(65) Prior Publication Data
US 2013/0339456 A1 Dec. 19, 2013

Related U.S. Application Data

(60) Provisional application No. 61/660,524, filed on Jun. 15, 2012.

(51) Int. Cl.
*G06F 15/16* (2006.01)
*G06Q 10/10* (2012.01)
*H04L 12/58* (2006.01)

(52) U.S. Cl.
CPC .............. *G06Q 10/107* (2013.01); *H04L 51/12* (2013.01)

(58) Field of Classification Search
CPC ... H04L 51/12; H04L 12/585; H04L 63/1408; H04L 63/0227; H04L 63/0263; H04L 63/0245; H04L 51/16; H04L 43/08; G06Q 10/107; G06F 15/16; G06F 20/00; G06F 21/577; G06F 17/27; G06F 17/28; G06F 17/30699; G06F 17/30707

USPC .................................................. 709/204, 206
See application file for complete search history.

(56) References Cited

U.S. PATENT DOCUMENTS 7,539,699 B2 * 5/2009 Kobashikawa et al. ........ 707/102
7,941,490 B1 * 5/2011 Cowings ........................ 709/206

(Continued)

OTHER PUBLICATIONS

Anh, et al., "Vietnamese Spam Detection based on Language Classification", Retrieved at <<http://ieeexplore.ieee.org/stamp/stamp.jsp?tp=&arnumber=4578936>>, Second International Conference on Communications and Electronics, Jun. 2008, pp. 74-79.
"Proofpoint Spam Detection Module", Retrieved at <<http://www.falkensecurenetworks.com/PDFs/DS_Proofpoint_Spam_Detection.pdf>>, Retrieved Date: Jan. 12, 2012, pp. 2.

(Continued)

*Primary Examiner* — Dustin Nguyen
*Assistant Examiner* — Austin Moreau
(74) *Attorney, Agent, or Firm* — Damon Rieth; Aaron Hoff; Micky Minhas

(57) ABSTRACT

Techniques to detect spam using language and a country of origin of an e-mail may include receiving an e-mail message for a recipient, detecting a country of origin for the e-mail message and detecting a language of the e-mail message. A technique may further include determining a country frequency with which the recipient communicates with the country of origin by e-mail, and a language frequency with which the recipient communicates in the language by e-mail. A technique may assign a first score to the message according to the country frequency, and a second score to the message according to the language frequency. The scores may used to determine whether the e-mail message is spam. Other embodiments are described and claimed.

20 Claims, 9 Drawing Sheets

(56) References Cited

U.S. PATENT DOCUMENTS

| | | | |
|---|---|---|---|
| 7,979,703 B2* | 7/2011 | Ellison et al. | 713/168 |
| 2004/0215726 A1* | 10/2004 | Arning et al. | 709/206 |
| 2004/0260776 A1 | 12/2004 | Starbuck et al. | |
| 2008/0172468 A1 | 7/2008 | Almeida | |
| 2009/0006569 A1* | 1/2009 | Morss et al. | 709/206 |
| 2009/0276208 A1 | 11/2009 | Pagan | |
| 2010/0263045 A1* | 10/2010 | Dulitz et al. | 726/22 |
| 2011/0246584 A1* | 10/2011 | Vitaldevara et al. | 709/206 |
| 2011/0252043 A1* | 10/2011 | Webb-Johnson | 707/748 |
| 2012/0226579 A1* | 9/2012 | Ha et al. | 705/26.35 |
| 2012/0259929 A1* | 10/2012 | Vitaldevara et al. | 709/206 |
| 2013/0325991 A1* | 12/2013 | Chambers et al. | 709/206 |

OTHER PUBLICATIONS

Evans, Jullian., "How to Filter Foreign Language Spam in Outlook", Retrieved at <<http://www.julianevansblog.com/2011/10/how-to-filter-foreign-language-spam-in-microsoft-outlook.html>>, Retrieved Date: Jan. 12, 2012, pp. 3.

"Symantec™ Premium AntiSpam", Retrieved at <<http://eval.symantec.com/mktginfo/enterprise/fact_sheets/b-spa_fs_99p_DS_10336492.en-us.pdf>>, Nov. 22, 2009, pp. 1-3.

"Upcoming Changes to Spam Filtering", Retrieved at <<http://www.uic.edu/depts/accc/ecomm/antispam/barracuda.html>>, Retrieved Date: Jan. 13, 2012, pp. 2.

* cited by examiner

TECHNIQUES TO FILTER ELECTRONIC MAIL BASED ON LANGUAGE AND COUNTRY OF ORIGIN

CROSS-REFERENCE TO RELATED APPLICATIONS

This application claims priority to commonly owned U.S. Provisional Patent Application No. 61/660,524 filed Jun. 15, 2012, the contents of which are incorporated herein in their entirety.

BACKGROUND

Most electronic mail (e-mail) providers provide a filtering service to remove or flag junk e-mail, known as spam, from a user's mailbox. Some filtering processes rely on rules that, when applied to an e-mail message, identify one or more characteristics of spam. For example, rules may look for names of pharmaceutical products, sexual content, or gibberish in the body of an e-mail message, and may remove messages that contain such content. As many e-mail providers increasingly serve a multi-national set of customers, more languages may appear in the e-mail traffic managed by the providers. Spam-filtering rules are generally language-specific, and adding more rules for additional languages typically does not scale well. Further, some languages use different character sets, including non-Roman alphabets. Some conventional rules use the reputation of a message's originating internet protocol (IP) address or uniform resource locator (URL) to identify spam. However, such reputation information may be sparse, particularly with respect to foreign countries. It is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to detect junk e-mail based on language and country of origin. Some embodiments are particularly directed to techniques to detect junk e-mail based on language and country of origin according to the recipient's e-mail history. In one embodiment, for example, a technique may include receiving an e-mail message for a recipient, detecting a country of origin for the e-mail message and detecting a language of the e-mail message. The technique may further include determining a country frequency with which the recipient communicates with the country of origin by e-mail, and a language frequency with which the recipient communicates in the language by e-mail. The technique may assign a first score to the message according to the country frequency, and a second score to the message according to the language frequency. The scores may used to determine whether the e-mail message is spam. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
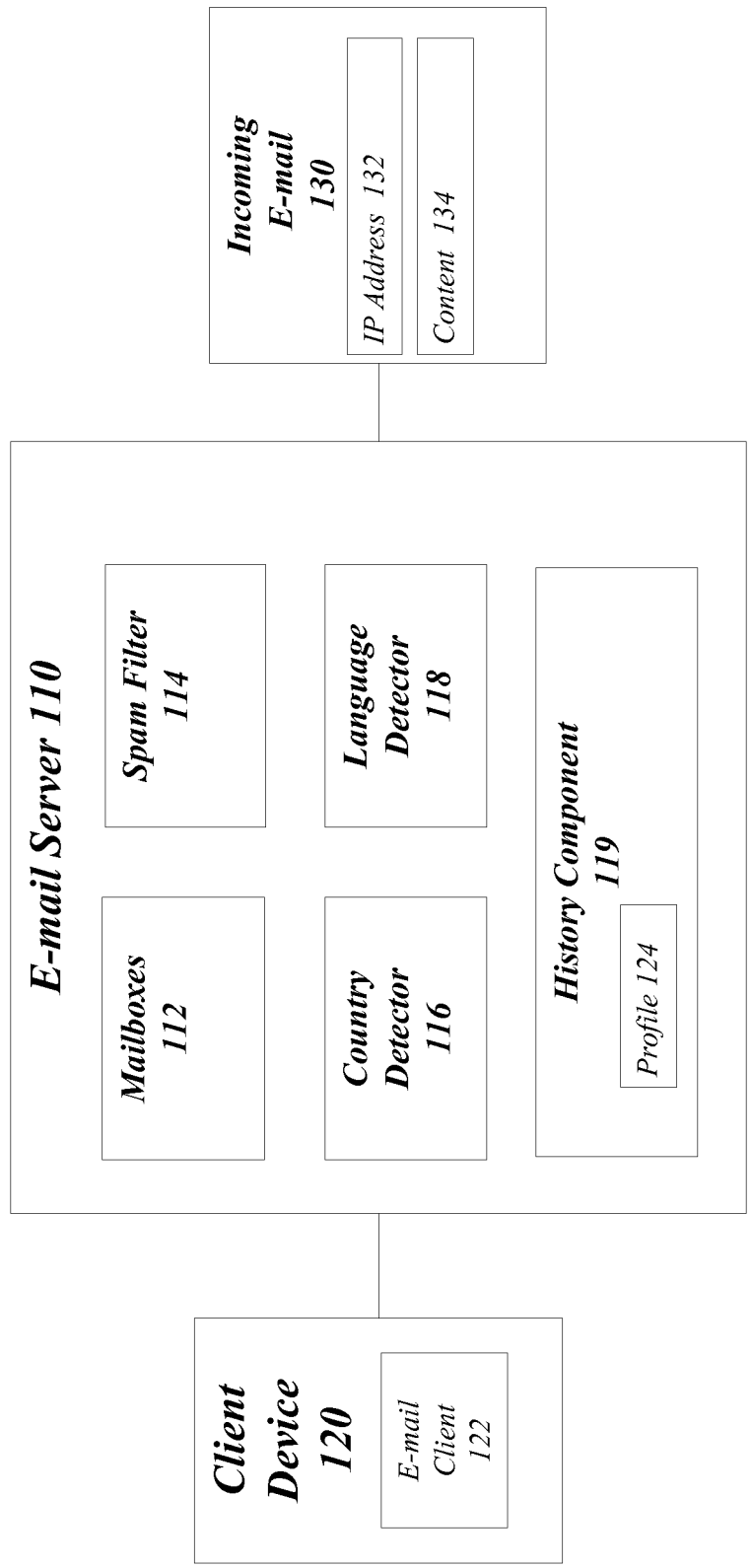
FIG. 1 illustrates an embodiment of a system to detect junk e-mail based on language and country of origin.

Various embodiments are directed to techniques to detect junk e-mail, often referred to as "spam," using the language and country of origin of an e-mail message. Various embodiments may determine the country of origin of an e-mail message and the language (or languages) that the e-mail is written in. Discrepancies between the country and language of a particular e-mail message and the habits of the recipient with respect to communications with that country and in that language may indicate that the message is spam. For example, if a recipient corresponds primarily in English and frequently in German, a message written in Chinese is likely to be spam. Similarly, if the recipient corresponds primarily with e-mail users in the United States and Canada, an e-mail message from India is likely to be spam. Embodiments may keep track of an e-mail user's e-mail behavior to determine patterns of use that can inform a spam designation. Relevant e-mail behavior may include, for example, the countries of origin for which e-mails are opened by the recipient or deleted without opening, countries to which the recipient sends e-mail, languages used in e-mails sent by the recipient, languages used in e-mails received and opened by the recipient or deleted without opening, and so forth. As a result, the embodiments can improve affordability, scalability, modularity, extendibility, or interoperability for an operator, device or network.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The appropriate structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a system 100. In one embodiment, the system 100 may include an e-mail server 110 and one or more client devices, such as client device 120. Although the system 100 shown in FIG. 1 has a limited number of elements in a certain topology, it may be appreciated that the system 100 may include more or less elements in alternate topologies as desired for a given implementation.

System 100 may include an e-mail server 110. E-mail server 110 may represent one or more electronic devices that provide and host e-mail services for multiple clients. E-mail server 110 may be implemented as one or more on-premises electronic devices, for example, for a business location. E-mail server 110 may be implemented as a remote or "cloud" deployment accessible over a network, such as the Internet. E-mail server 110 may be arranged to provide e-mail services such as, but not limited to, receiving e-mail messages for an e-mail account, sending e-mail messages from an e-mail account, storing e-mail messages, and providing filtering services, such as spam filtering.

In an embodiment, e-mail server 110 may include various functional components, such as a spam filter 114, a country detector 116 and a language detector 118. E-mail server 110 may include alternate, fewer or additional components to provide the functionality described herein. In various embodiments, some components may be combined into one component. The embodiments are not limited to these examples. E-mail server 110 may store e-mail messages in mailboxes 112. Each e-mail account may have its own mailbox 112. A mailbox 112 may represent the logical storage for all e-mail messages of one account. A mailbox 112 may have sub-mailboxes (not shown), such as an inbox, a sent mail box, a deleted items box, and user-defined boxes. A mailbox 112 may store all messages for an e-mail account until a user chooses to delete the messages from e-mail server 110.

E-mail server 110 may include spam filter 114. Spam filter 114 may provide operations to examine received e-mails to determine whether the e-mail is welcomed or unwelcomed, unsolicited e-mail, e.g. spam. In various embodiments, spam filter 114 may examine, in particular, the country of origin of a received e-mail and the language of the text of the e-mail to make a spam determination. Spam filter 114 is described further with respect to FIG. 3.

E-mail server 110 may include country detector 116. Country detector 116 may provide operations to examine a received e-mail, such as e-mail 130, and determine the country from which the e-mail was sent. For example, country detector 116 may use the Internet protocol (IP) address 132 in the e-mail and identify the country to which the IP address was allocated. Country detector 116 may provide the identified country to spam filter 114 and/or to history component 119, as will be discussed.

E-mail server 110 may include language detector 118. Language detector 118 may detect the language, or languages, in which an email is written. Conventionally, language detection might occur by examining the character set used by the e-mail message, for example, as included in the multipurpose internet mail extensions (MIME) content. However, some character sets are common to many, if not all, languages and this method may not be robust in distinguishing, for example, German and Dutch, or Portuguese and Spanish. Language detector 118 may examine the actual content 134, e.g. the body or text, in an e-mail message 130 and use language detection techniques to identify the language or languages used. Language detector 118 may provide the identified language(s) to spam filter 114 and/or to history component 119, as will be discussed.

E-mail server 110 may include history component 119. History component 119 may track the behavior of an e-mail account and store data about the behavior in a profile 124 for the e-mail account. For example, and without limitation, history component may log the countries of origin of received e-mail messages, the countries to which outgoing e-mails are sent, the languages of received e-mails, and the languages in outgoing e-mails. History component 119 may further track information about received e-mails when the account user deletes the e-mail without reading the e-mail, manually marks the e-mail as "junk" or spam, opens the e-mail, responds to the e-mail, and other user-initiated behavior regarding e-mail messages. History component 119 may store a log of this information as profile 124 to develop a behavior profile for the account user that may be used by spam filter 114 to further refine spam detection. History component 119 may generate statistics about an account user's e-mail behavior. For example, history component 119 may calculate a country frequency indicating that 95% of received e-mail messages in one e-mail account are from Germany, or a language frequency indicating that the account user writes 60% of e-mails in English and 40% in French.

E-mail server 110 may include additional functional components (not shown) that operate to provide the e-mail management services provided by e-mail server 110. Such functional components may, for example, identify an intended recipient, process and apply mail rules created by a recipient, synchronize with mobile or remote clients, and so forth.

System 100 may include a plurality of client devices, such as client device 120. Client device 120 may include any electronic device capable of communicating with e-mail server 110 to send, receive and manage e-mail messages in an e-mail account. Client device 120 may respond to user directives received through various input devices, e.g. a keyboard, touch screen, a mouse, a stylus, a voice response system, and so forth. User directives may cause client device 120 to, for example, launch e-mail client 122, select an e-mail, delete an e-mail, generate a new e-mail message and add text to the e-mail message, and so forth.

E-mail client 122 may be a software application comprising instructions that, when executed by client device 120, provide an interface for viewing, composing, and managing e-mail messages. E-mail client 122 may connect to e-mail server 110 to download new messages and to send messages composed on client device 120. E-mail client 122 may be a stand-alone application, such as, e.g. MICROSOFT OUTLOOK® from MICROSOFT CORPORATION®. E-mail client 122 may be a web client that accesses e-mail server 110 through a web browser application such as EXPLORER® from MICROSOFT CORPORATION®.

Figure 2:
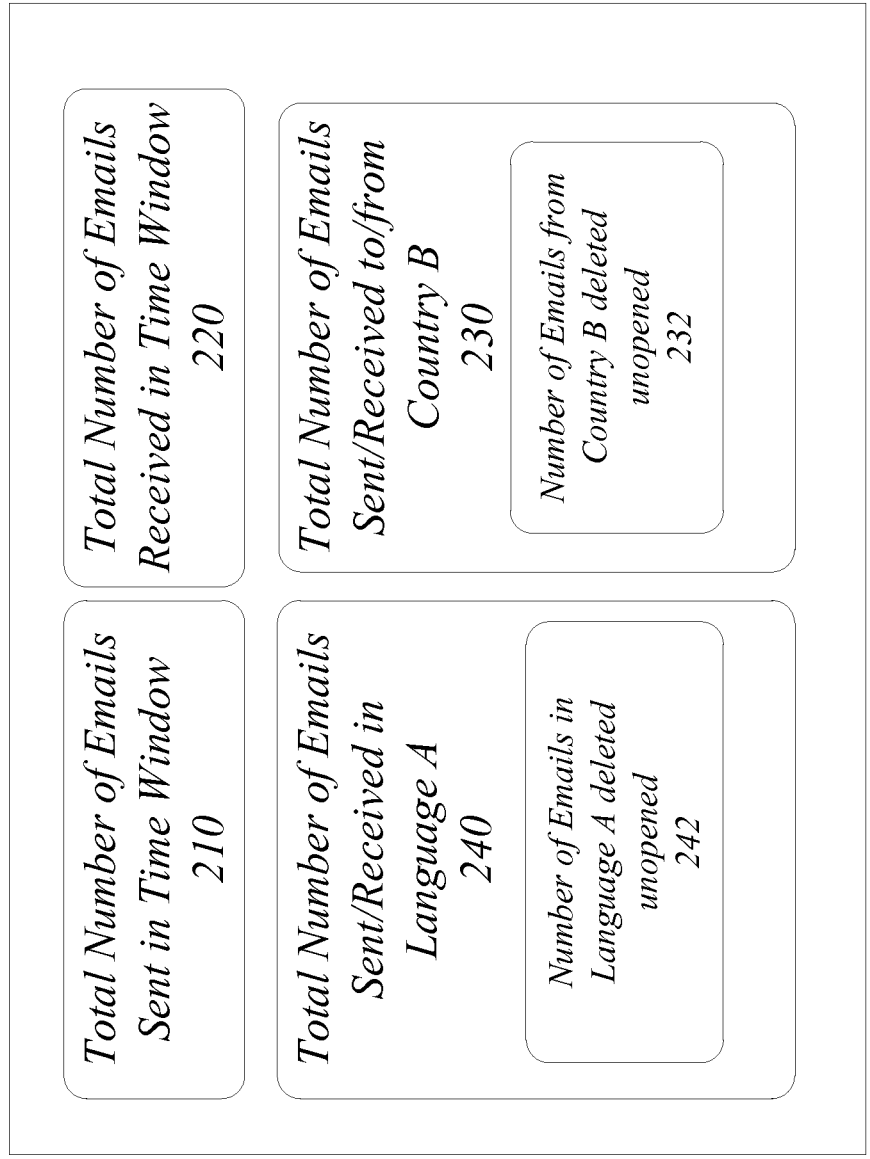
FIG. 2 illustrates an embodiment of a profile.

FIG. 2 illustrates an example of a profile 200. Profile 200 may be a one representative example of profile 124. Profile 200 may be associated with one specific e-mail account, and may reflect behavior of the account user with respect to e-mail. For example, profile 200 may include a total number of e-mails sent in a time window (210) and a total number of e-mails received in the time window (220). The time window may be a time period that begins at some time in the past, e.g. 6 months ago, and includes time up to the present moment.

Profile 200 may also include counts of subsets of sent and received e-mails. For example, profile 200 may include a total count of e-mail messages sent/received to/from a specific country B (230). Profile 200 may include multiple counts 230, one for each country detected by country detector 116. Profile 200 may include further subsets of sent and received e-mails with respect to the specific country, for example, a number of e-mails from that country that were deleted without being opened (232). Other behaviors with respect to the country may be captured as well.

Profile 200 may also include a total count of e-mail messages sent/received that are written in a specific language A (240). Profile 200 may include multiple counts 240, one for each language detected by language detector 118. Profile 200 may include further subsets of sent and received e-mails with respect to the specific language, for example, a number of e-mails in that language that were deleted without being opened (242). Other behaviors with respect to the language may be captured as well.

In an embodiment, data older than the time window may be retained in profile 200 and may be used to calculate a frequency with which the account user communicates in a language or with a country. However, such older profile data may have less weight in such calculations than more current data.

Figure 3:
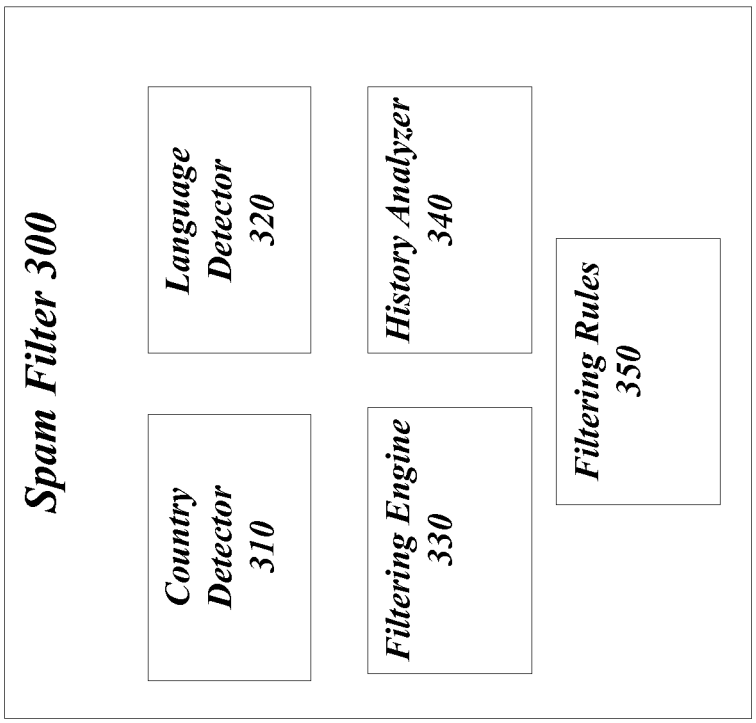
FIG. 3 illustrates an embodiment of a spam filter.

FIG. 3 illustrates an embodiment of spam filter 300. Spam filter 300 may be a representation of spam filter 114. Spam filter 300 may be a component of e-mail server 110, for example. Spam filter 300 may be a stand-alone application or functional unit that may be invoked or called by an e-mail server or e-mail client to provide spam filtering services.

Although spam filter 300 shown in FIG. 3 has a limited number of elements in a certain topology, it may be appreciated that spam filter 300 may include more or less elements in alternate topologies as desired for a given implementation. Spam filter 300 may include various functional components, such as filtering engine 330 and history analyzer 340. Spam filter 300 may include alternate, fewer or additional components to provide the functionality described herein. In various embodiments, some components may be combined into one component. The embodiments are not limited to these examples.

In various embodiments, spam filter 300 may optionally include country detector 310 and/or language detector 320. In particular, spam filter 300 may include one or both of these components when an e-mail server using spam filter 300 does not have country and/or language detectors, or does not make their results available to spam filter 300. Country detector 310 and language detector 320 may operate similarly to country detector 116 and language detector 118.

Spam filter 300 may include a set of filtering rules 350. Filtering rules 350 may be stored in a storage medium accessible to spam filter 300. Filtering rules 350 may be a set of logical constructs that can be applied to information about an e-mail message to determine whether the message is spam or not. A filtering rule 350 may, for example, assign a weight or score to an e-mail message according to how the e-mail message fits the rule. For example, suppose a filtering rule includes a list of words that tend to indicate spam, such as names of pharmaceuticals, profanity, or sexual terms. The rule may specify that if an e-mail includes a word from the list, a score may be assigned, for example, to a weighted cumulative sum. If several words from the list appear in the e-mail, the score may increase. If the score reaches a threshold value, the e-mail message may be determined to be spam.

Spam filter 300 may include a filtering engine 330. Filtering engine 330 may operate to evaluate an e-mail message against filtering rules 350, assign a score, and determine whether the e-mail message is spam or not. Filtering engine 330 may work with history analyzer 340 to evaluate an e-mail message according to behavior or history-related filtering rules. History analyzer 340 may receive information from history component 119 about an e-mail recipient's country and language activity. For example, suppose a filtering rule states that if the country of origin of a received e-mail does not match the countries that the recipient communicates with, then assign a score that indicates a high probability of that the message is spam. Filtering engine 330 may request, from history analyzer 340, the countries that the recipient communicates with. History analyzer 340 may request or retrieve that information from history component 119 and provide it to filtering engine 330.

In an embodiment, filtering engine 330 may accumulate the scores resulting from applying the filtering rules 350 to generate a total spam determination measure. Each filtering rule 350 may generate its own score, which may be weighted according to how strongly the particular rule predicts spam. The total spam determination measure may take the form: $S = w_1 s_1 + w_2 s_2 + \ldots w_n s_n$ where w represents a weight and s indicates the score from applying a rule. In some embodiments, S may be compared to a threshold value after the application of each rule, and when S exceeds the threshold, the message may be determined to be spam and further rule application may cease. In some embodiments, S may be compared to the threshold after all of the filtering rules have been applied.

In an embodiment, history analyzer 340 may read logs generated by history component 119 e.g. profile 124, and perform its own statistical analysis of the profile data. In such an embodiment, history component 119 may perform fewer analytical functions and may, more simply, log the relevant data without analysis. History analyzer 340 may compile a profile or other statistical information about a particular account user's e-mail-related behavior. As previously described, this may include determining the primary country or countries with which a user corresponds, the primary language(s) used in correspondence for the user, and so forth. The embodiments are not limited to these examples.

In determining a profile for a user, either history component 119 or history analyzer 340 may update the profile periodically or continually. Newer behavior may affect the profile more than older behavior. For example, if a user had corresponded extensively in Russian for a time period of six months, but had then stopped corresponding in Russian for the following eight months, then Russian would no longer be considered to be a language of correspondence for the user.

Either history component 119 or history analyzer 340 may keep track of a total number of e-mails sent and/or received by a specific user account within a recent time period, e.g. the past six months. From that total number, history component 119 or history analyzer 340 may determine how many were sent in language A (e.g. English), language B (e.g. French), and so forth. The languages appearing in the highest percentages may be considered to be the user's commonly used languages, against which new e-mails may be analyzed. Similarly, history component 119 or history analyzer 340 may determine how many e-mails were received from country A (e.g. the U.S.) and from country B (e.g. France). The countries of origin used, e.g. received from or sent to, in the largest number of e-mails may be considered to be the user's commonly "used" countries.

The determination of a commonly used country or language may be affected by factors in addition to frequency. For example, a language frequency for language C (e.g. Chinese) may be modified or weighted by how many times an e-mail sent in language C is actually opened, or deleted without opening. For example, a high volume of e-mails received in Chinese could potentially cause Chinese to be considered one of the user's commonly used languages, unless the user never opens e-mails in Chinese and just deletes them. In such a case, Chinese would not be considered to be one of the user's commonly used languages. History component 119 or history analyzer 340 may perform other analyses to generate a profile of an account beyond the examples provided herein.

Figure 4:
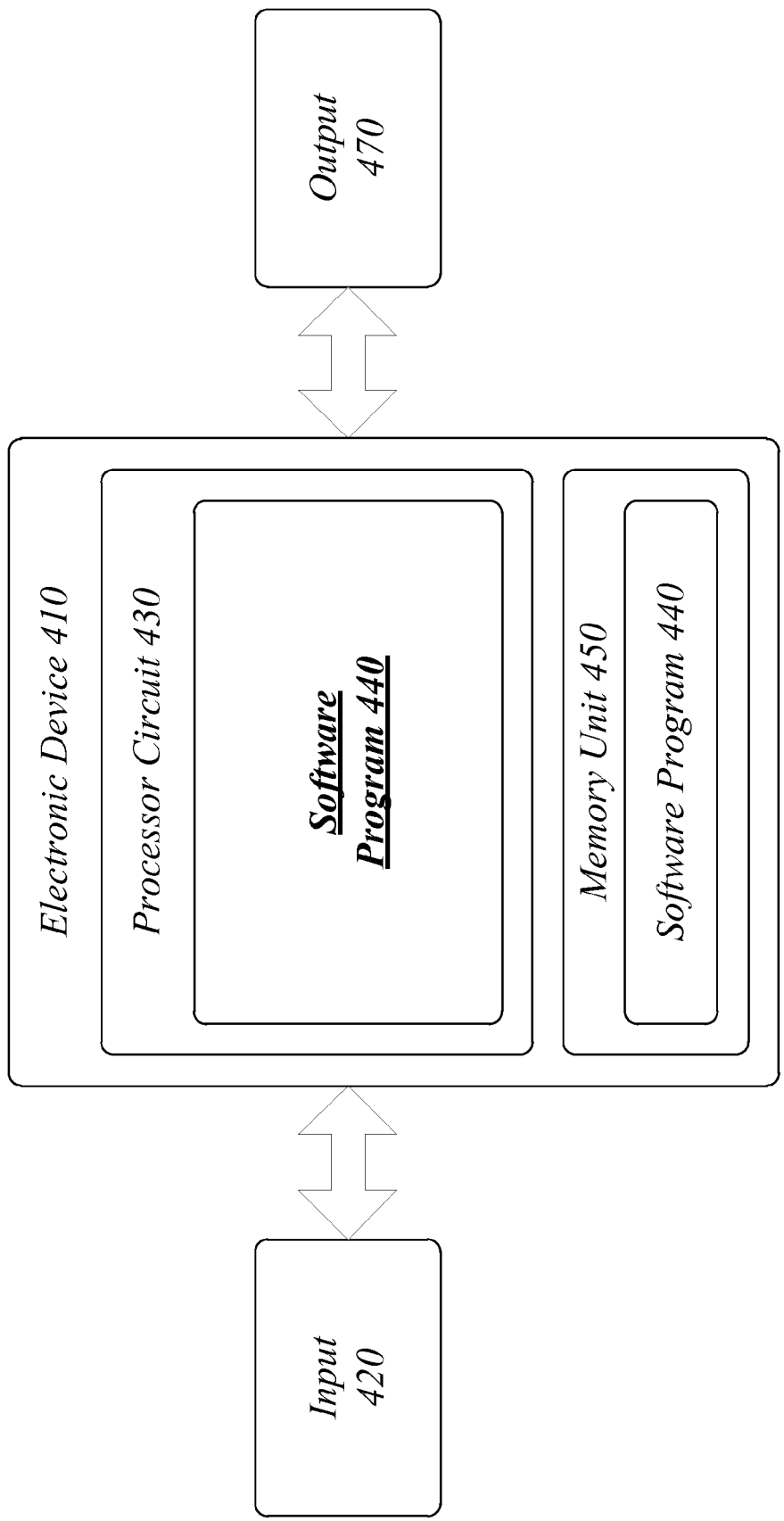
FIG. 4 illustrates an embodiment of a system to implement components of the system of FIG. 1.

FIG. 4 illustrates an embodiment of a system 400 for the system 100. In one embodiment, the system 400 may include an electronic device 410. Electronic device 410 may be a representative example of a client device 120. Electronic device 410 may be a representative of a device used to implement e-mail server 110. Although system 400 shown in FIG. 4 has a limited number of elements in a certain topology, it may be appreciated that system 400 may include more or fewer elements in alternate topologies as desired for a given implementation.

Electronic device 410 may receive inputs 420, for example, user directives from an input device such as a keypad, stylus or fingertip. Inputs 420 may also include data and instructions received over a network, for example, from e-mail server 110. Electronic device 420 may transmit outputs 470, for example, requests to connect to e-mail server 110, e-mail messages, and so forth.

Electronic device 410 may include a processor circuit 430 and a memory unit 450. Processor circuit 430 may be a processing unit or component as described in greater detail below. Memory unit 450 may be, for example, a system memory or other memory device capable of storing instructions and/or data for short term or long term storage.

Electronic device 410 may include a software program 440. In an embodiment, instructions for software program 440 may be stored in memory unit 450. Software program 440 may be executed on processor circuit 430 to provide some functionality on electronic device 410. For example, software program 440 may provide e-mail client 122. The embodiments are not limited to these examples.

When electronic device 410 is used to implement a server such as e-mail server 110, multiple software programs 440 may provide e-mail server operations, spam filtering operations, history component operations and so forth. The embodiments are not limited to these examples.

Figure 5:
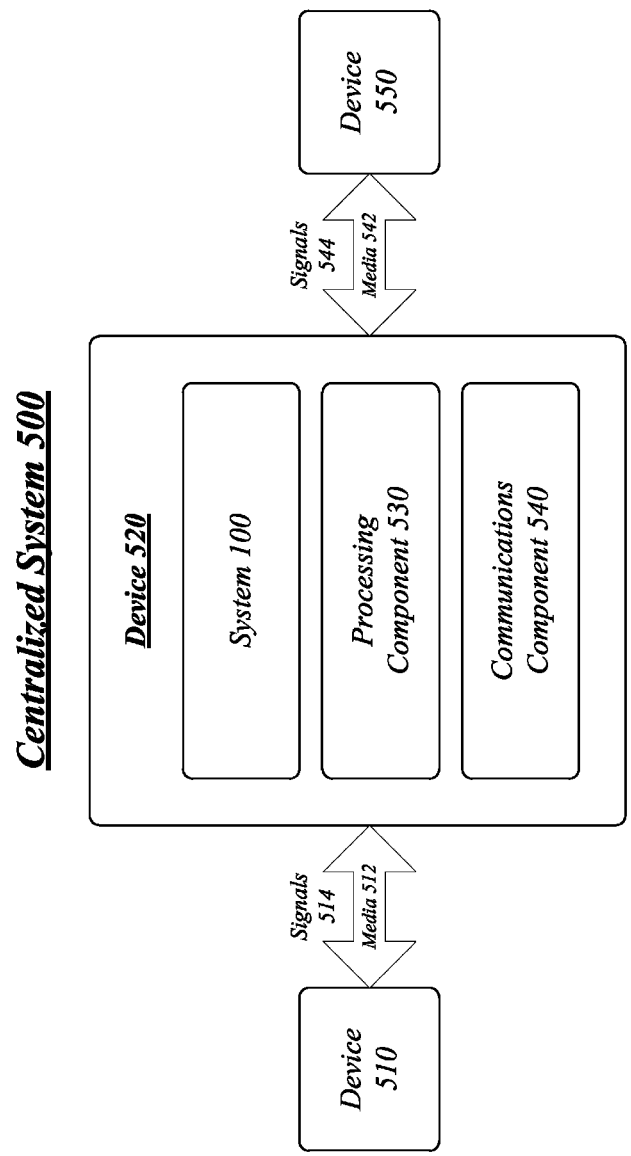
FIG. 5 illustrates an embodiment of a centralized system for the system of FIG. 1.

FIG. 5 illustrates a block diagram of a centralized system 500. The centralized system 500 may implement some or all of the structure and/or operations for the system 100 in a single computing entity, such as entirely within a single device 520.

The device 520 may comprise any electronic device capable of receiving, processing, and sending information for the system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 520 may execute processing operations or logic for the system 100 using a processing component 530. The processing component 530 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 520 may execute communications operations or logic for the system 100 using communications component 540. The communications component 540 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 540 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 512, 542 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 520 may communicate with other devices 510, 550 over a communications media 512, 542, respectively, using communications signals 514, 544, respectively, via the communications component 540. The devices 510, 550 may be internal or external to the device 520 as desired for a given implementation.

In an embodiment, device 520 may represent a device that sends and receives e-mails, performs spam filtering and on which a user can access and manage an e-mail account without having to connect with a separate device. Alternatively, device 520 may represent a client device that performs spam filtering on the client rather than at the e-mail server servicing the account. The embodiments are not limited to these examples.

Figure 6:
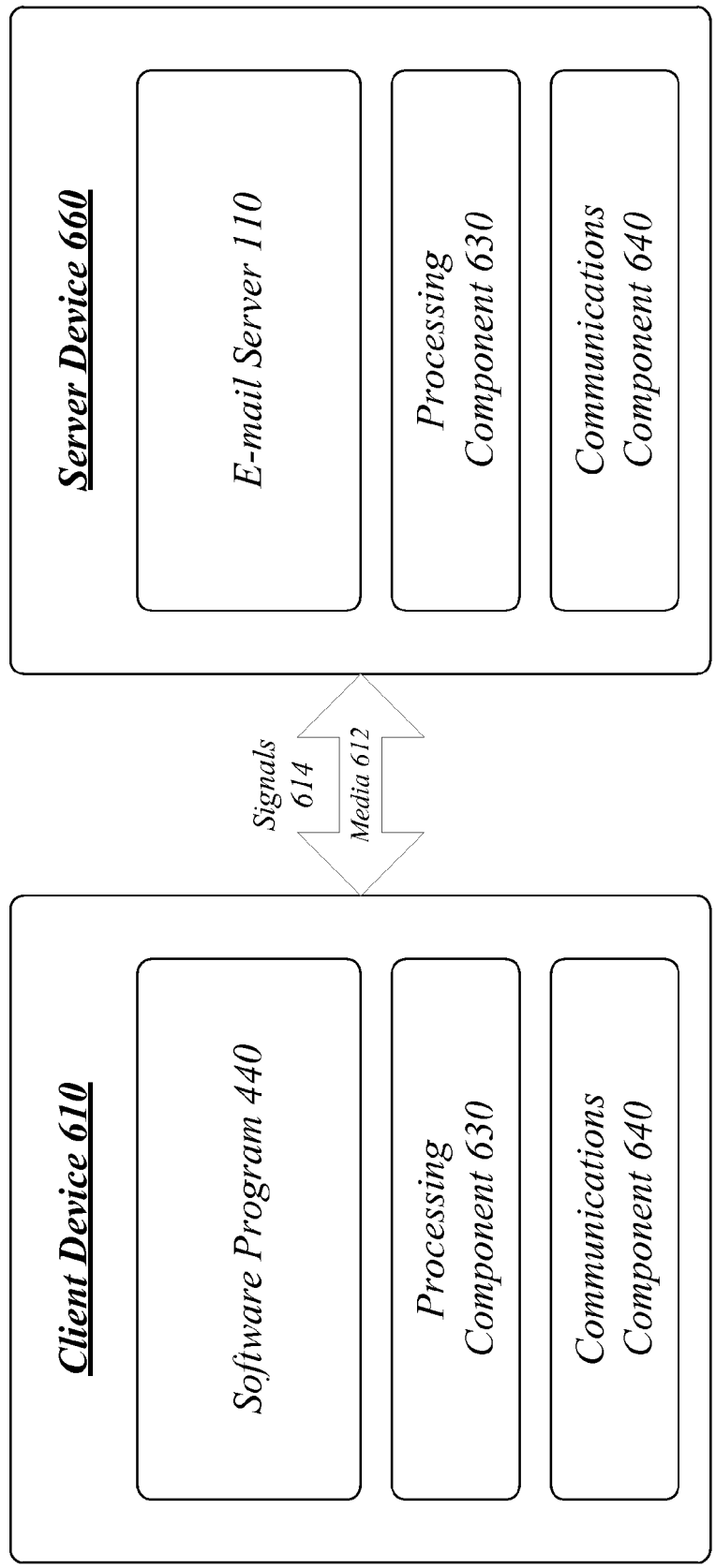
FIG. 6 illustrates an embodiment of a distributed system for the system of FIG. 1.

FIG. 6 illustrates a block diagram of a distributed system 600. The distributed system 600 may distribute portions of the structure and/or operations for the system 100 across multiple computing entities. Examples of distributed system 600 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 600 may comprise a client device 610 and a server device 650. In general, the client device 610 and the server device 650 may be the same or similar to the device 520 as described with reference to FIG. 5. For instance, the client system 610 and the server system 650 may each comprise a processing component 630 and a communications component 640 which are the same or similar to the processing component 530 and the communications component 540, respectively, as described with reference to FIG. 5. In another example, the devices 610, 650 may communicate over a communications media 612 using communications signals 614 via the communications components 640.

The client device 610 may comprise or employ one or more client programs that operate to perform various methodologies in accordance with the described embodiments. In one embodiment, for example, the client device 610 may implement software program 440, e.g. an e-mail client program.

The server device 650 may comprise or employ one or more server programs that operate to perform various methodologies in accordance with the described embodiments. In one embodiment, for example, the server device 650 may implement e-mail server 110 and/or its components as shown in FIG. 1.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 7:
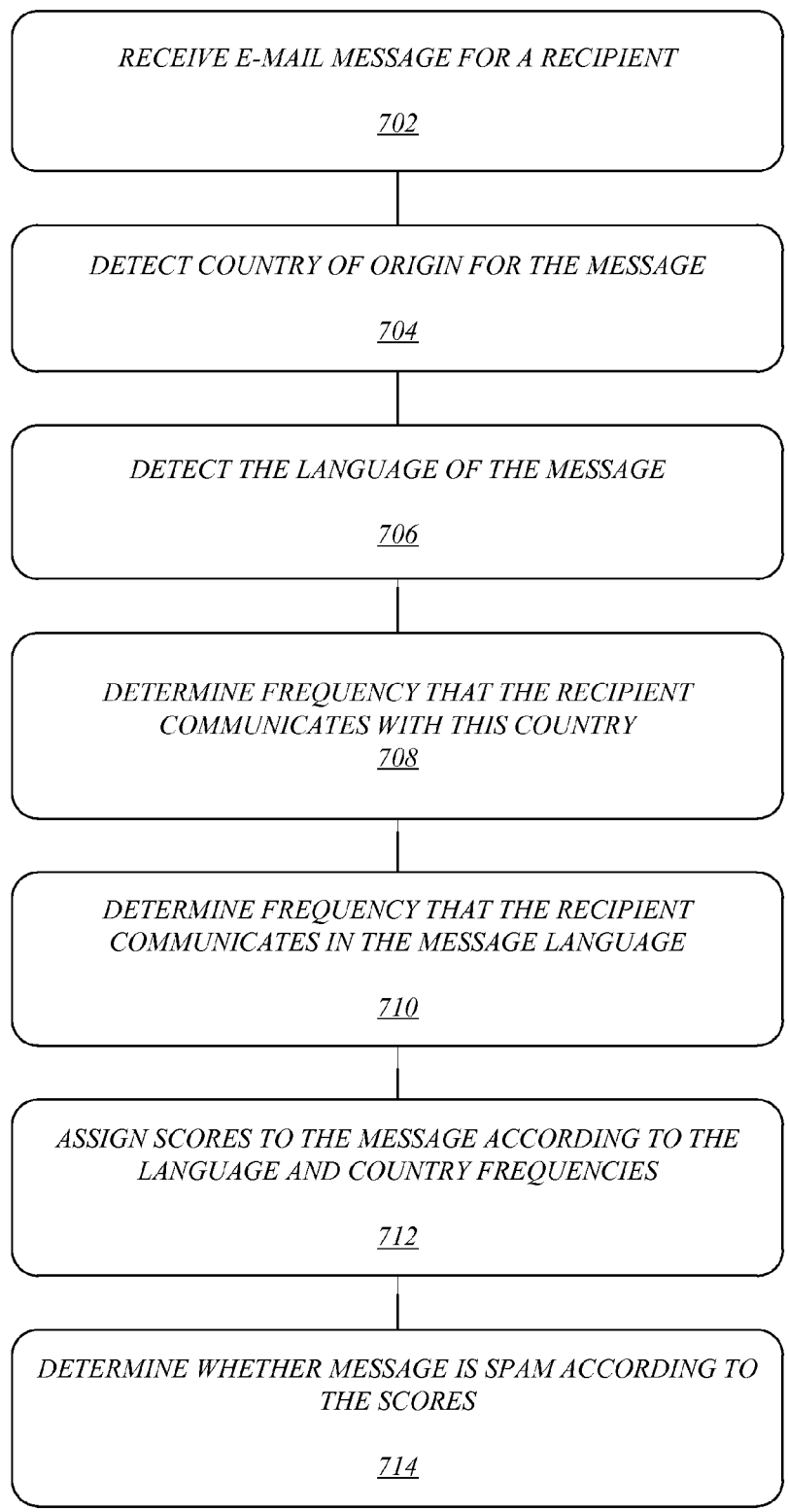
FIG. 7 illustrates an embodiment of a logic flow for the system of FIG. 1.

FIG. 7 illustrates one embodiment of a logic flow 700. Logic flow 700 may be representative of some or all of the operations executed by one or more embodiments described herein. The operations of logic flow 700 may be executed, for example, by e-mail server 110, spam filter 114, 300, or a combination thereof.

In the illustrated embodiment shown in FIG. 7, logic flow 700 may receive an e-mail message for a recipient at block 702. For example, e-mail server 110 may receive an e-mail 130 ("the message") intended for a recipient. E-mail server 110 may identify the intended recipient and locate a mailbox 112 for the recipient.

Logic flow 700 may determine a country of origin for the message at block 704. For example, country detector 116, 310 may examine the IP address 132 of the message and identify the country to which it was assigned.

Logic flow 700 may determine the language of the message at block 706. For example, language detector 118, 320 may examine the content 134 of the message and analyze the text to determine one or more languages used in the body of the message. In an embodiment, language detector 118, 320 uses the content of the message, e.g. what the sender typed into the body, rather than, for example, MIME contents or character set information.

Logic flow 700 may determine the frequency that the recipient communicates with the country of origin at block 708. For example, history component 119 and/or history analyzer 340 may examine profile 124, 200 or other stored information for the recipient. From the profile data, a country frequency can be determined, for the country of origin identified for the message, by determining how many e-mail messages were sent to or received from the identified country out of all e-mail messages sent or received within a time window. For example, if the country of origin identified in the message is Russia, and the recipient received two e-mail messages from Russia out of the last 100 e-mails in the most recent time window, then the country frequency for Russia may be 2%. This frequency may be modified as described above, for example, by only counting the country of origin in the country frequency calculation if the recipient opens or reads the e-mail. For example, if the recipient had deleted both of the Russia-originated e-mails without reading them, then the country frequency for Russia would be 0%.

Logic flow 700 may determine a frequency that the recipient communicates in the language at block 710. For example, history component 119 and/or history analyzer 340 may examine profile 124, 200 or other stored information for the recipient. From the profile data, a language frequency can be determined, for the language or languages identified for the message, by determining how many e-mail messages written in that language were sent or received of all e-mail messages sent or received within a time window. For example, if the language determined is Chinese, and the recipient sent and received 50 e-mails in Chinese out of the last 100 e-mails in the most recent time window, then the language frequency for Chinese may be 50%. Similarly to the country frequency, a language frequency may be modified according to user behavior regarding e-mails in that language. If the recipient never opens e-mails in Chinese, for example, then the language frequency for Chinese may be 0% despite the 50 e-mails received.

Logic flow 700 may assign a score to the message according to the language and country frequencies at block 712. For example, when the country frequency is high for the country of origin, filtering engine 330 may assign a score for a country filtering rule that indicates a low probability of spam. If the country frequency is low or zero for the country of origin, then filtering engine 330 may assign a score for the country filtering rule that indicates a high probability of spam.

In some embodiments, frequencies may be grouped in ranges, where each range of frequencies may be associated with a score. For example, frequencies between 70 and 100% may be associated with a low spam probability score, e.g. 0; while frequencies between 30 and 59% may be associated with a moderate probability score, e.g. 0.5 (on a 0 to 1 scale); and frequencies below 30% may be associated with a high probability score, e.g. 0.9 or 1. More or fewer ranges may be used. In other embodiments, the frequency may be inversely assigned as the score. For example, a frequency of 35% may generate a score of 1−0.35=0.65. The embodiments are not limited to these examples.

Similarly, when the language frequency is high, filtering engine 330 may assign a score for a language filtering rule that indicates a low probability of spam. If the language frequency is low or zero for the language, then filtering engine 330 may assign a score for the language filtering rule that indicates a high probability of spam.

Logic flow 700 may determine whether the message is spam according to the scores at block 714. For example, the scores for the country filtering rule and the language filtering rule may be added together by filtering engine 330 and compared to a threshold value. In some embodiments, the language score and/or the country score may be weighted before being summed. When the sum of the scores exceeds a threshold value, the message may be determined to be spam.

In some embodiments, additional filtering rules may be applied before, between, and/or after the blocks of logic flow 700. The country of origin and the language(s) of the message may be used in combination as a filtering rule. For example, if the language used is not a common language used in the country of origin, e.g. a message from Thailand written in Russian, the message has a higher probability of being spam. A filtering rule may therefore check the language of the e-mail against languages used in the country of origin. The embodiments are not limited to this example.

Figure 8:
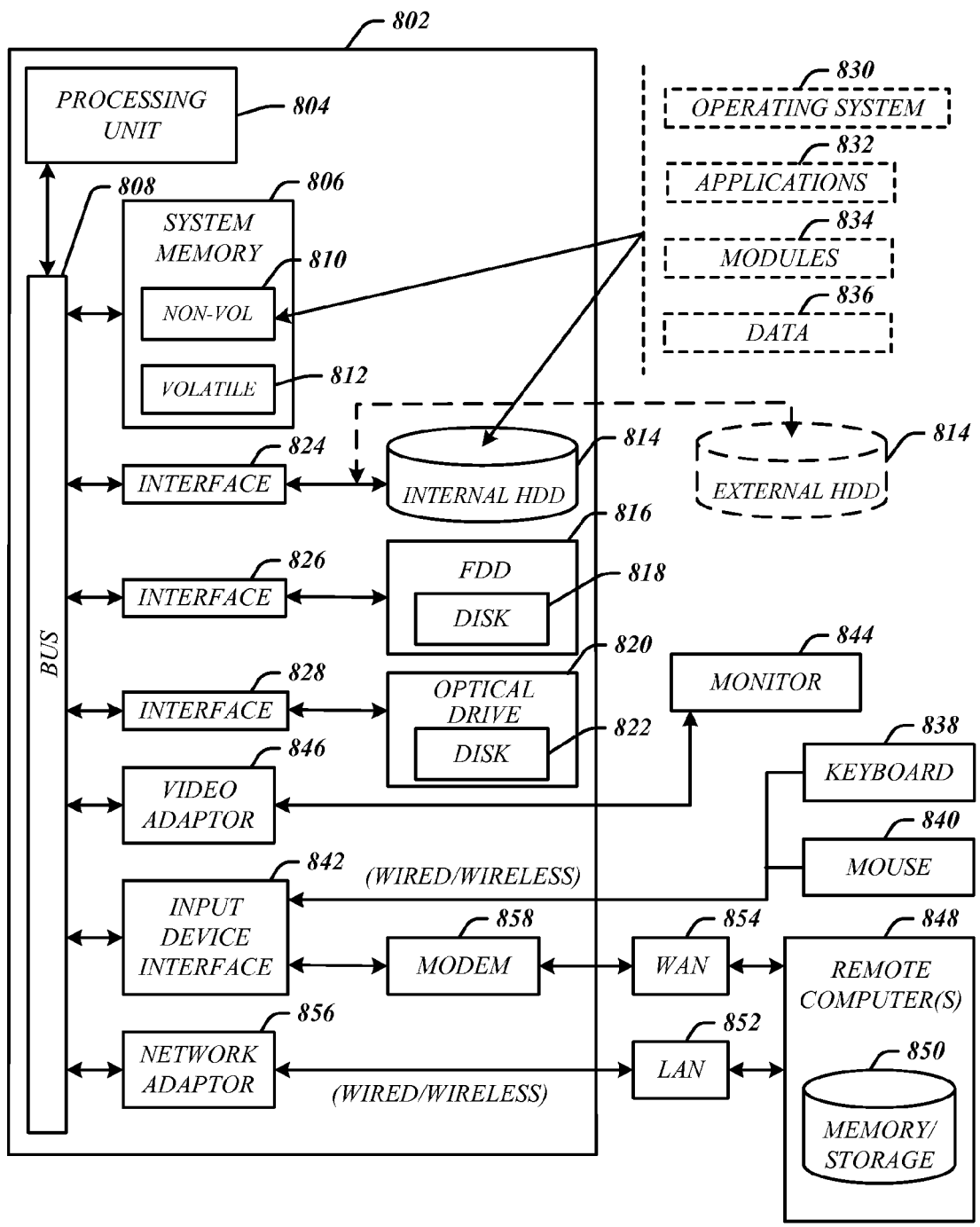
FIG. 8 illustrates an embodiment of a computing architecture.

FIG. 8 illustrates an embodiment of an exemplary computing architecture 800 suitable for implementing various embodiments as previously described. In one embodiment, the computing architecture 800 may comprise or be implemented as part of an electronic device. Examples of an electronic device may include those described with reference to FIGS. 4 and 5, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the system 100.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
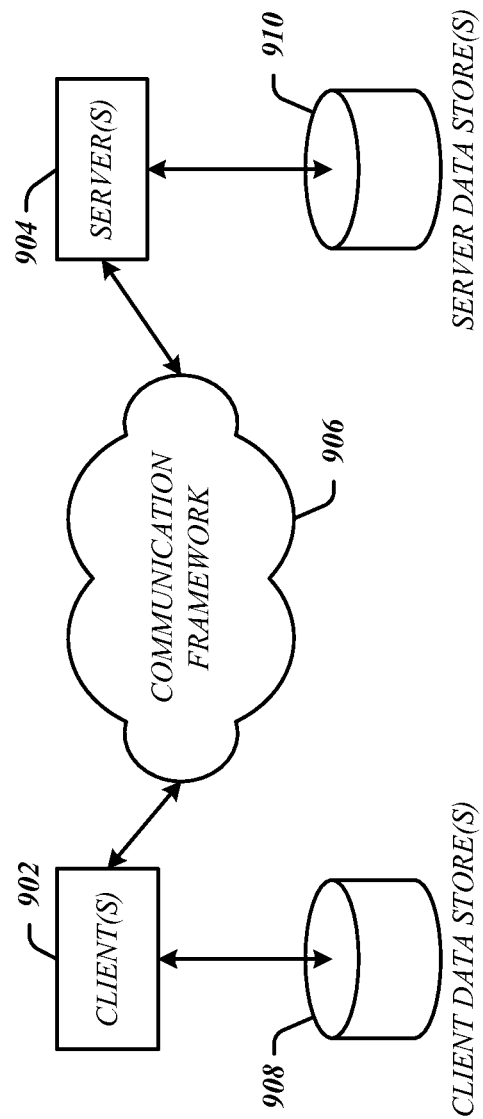
FIG. 9 illustrates an embodiment of a communications architecture.

FIG. 9 illustrates a block diagram of an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 902 and servers 904. The clients 902 may implement the client device 610. The servers 904 may implement the server device 650. The clients 902 and the servers 904 are operatively connected to one or more respective client data stores 908 and server data stores 910 that can be employed to store information local to the respective clients 902 and servers 904, such as cookies and/or associated contextual information.

The clients 902 and the servers 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
a logic circuit; and
spam filtering logic operative on the logic circuit to:
    detect a country of origin for an e-mail message to a recipient;
    detect a language of the e-mail message;
    assign a first score to the message according to a country frequency, wherein the country frequency indicates a frequency with which the recipient communicates with a country of origin by e-mail;
    assign a second score to the message according to a language frequency, wherein the language frequency indicates a frequency with which the recipient communicates in a language by e-mail; and
    filter the e-mail message according to the first score and the second score.

2. The apparatus of claim 1, comprising a history component operative on the logic circuit to store a profile for a recipient including data about a country of origin and a language each time an e-mail message is sent, read or deleted.

3. The apparatus of claim 2, the history component operative to aggregate the profile to calculate the country frequency for each country to which the recipient sends e-mail and from which the recipient receives e-mail, and to calculate the language frequency for each language used in an e-mail sent by or received for the recipient.

4. The apparatus of claim 2, the history component operative to calculate the country frequency and the language frequency from profile data within a time window, wherein profile data from within the time window has greater weight that profile data from older than the time window.

5. The apparatus of claim 1, the spam filtering logic operative to:
    detect a plurality of languages from the content of the e-mail message;
    determine a separate language frequency for each language; and
    assign a separate score for each of the separate language frequencies.

6. The apparatus of claim 1, the spam filtering logic operative to:
    assign the first score to a value inversely proportional to the country frequency;
    assign the second score to a value inversely proportional to the language frequency; and wherein a higher score indicates a higher probability that the e-mail message is spam.

7. The apparatus of claim 6, the spam filtering logic further to:
determine a set of languages common to the country of origin;
determine whether the detected language is in the set; and
assign a third score according to whether the detected language is in the set, wherein the third score indicates a higher probability that the message is spam when the detected language is not in the set.

8. A computer-implemented method, comprising:
receiving an e-mail message for a recipient;
detecting a country of origin for the e-mail message;
detecting a language of the e-mail message;
determining at least one of a country frequency with which the recipient communicates with a country of origin by e-mail, or a language frequency with which the recipient communicates in a language by e-mail;
assigning a first score to the message according to the country frequency;
assigning a second score to the message according to the language frequency; and
using the first score and the second score to determine whether the e-mail message is spam.

9. The computer-implemented method of claim 8, comprising using network address of the e-mail message to determine the country of origin.

10. The computer-implemented method of claim 8, comprising detecting a language from the content of the e-mail message.

11. The computer-implemented method of claim 10, comprising:
detecting a plurality of languages from the content of the e-mail message;
determining a separate language frequency for each language; and
assigning a score for each of the separate language frequencies.

12. The computer-implemented method of claim 8, comprising applying an additional filter rule to determine whether the e-mail message is spam, when the first and second scores do not cause the e-mail message to be determined to be spam.

13. The computer-implemented method of claim 8, comprising:
determining the country frequency and the language frequency from a profile of the recipient; and
updating the profile of the recipient with data about a country of origin and a language each time an e-mail message is sent, read or deleted.

14. The computer-implemented method of claim 8, wherein:
the first score is inversely proportional to the country frequency;
the second score is inversely proportional to the language frequency; and
a higher score indicates a higher probability that the e-mail message is spam.

15. The computer-implemented method of claim 14, comprising:
determining a set of languages common to the country of origin;
determining whether the detected language is in the set; and assigning a third score according to whether the detected language is in the set, wherein the third score indicates a high probability that the message is spam when the detected language is not in the set.

16. An article of manufacture comprising at least one computer-readable storage device comprising instructions that, when executed, cause a system to:
detect a country of origin for a received e-mail message;
detect a language of the e-mail message;
determining at least one of a country frequency with which the recipient communicates with the country of origin by e-mail or a language frequency with which the recipient communicates in the language by e-mail;
assigning a first score to the message according to the country frequency;
assigning a second score to the message according to the language frequency; and
using the first score and the second score to determine whether the e-mail message is spam.

17. The article of claim 16, comprising instructions that when executed cause the system to:
add the first score and second score to generate a total score;
compare the total score to a threshold; and
determine the e-mail message to be spam when the total score exceeds the threshold.

18. The article of claim 16, wherein:
a first range of country frequencies is associated with a first country score;
a second range of country frequencies is associated with a second country score;
a first range of language frequencies is associated with a first language score;
a second range of language frequencies is associated with a second language score; and
the medium comprising instructions that when executed cause the system to:
assign the first country score to the message when the determined country frequency is in the first range of country frequencies and the second country score when the determined country frequency is in the second range of country frequencies; and
assign the first language score to the message when the determined language frequency is in the first range of language frequencies and the second language score when the determined language frequency is in the second range of language frequencies.

19. The article of claim 16, comprising instructions that when executed cause the system to:
determine a set of languages common to the country of origin;
determine whether the detected language is in the set; and
assign a third score according to whether the detected language is in the set, wherein the third score indicates a higher probability that the message is spam when the detected language is not in the set.

20. The article of claim 16, comprising instructions that when executed cause the system to:
detect a plurality of languages from the content of the e-mail message;
determine a separate language frequency for each language; and
assign a separate score for each of the separate language frequencies.

* * * * *